(12) United States Patent
Shin et al.

(10) Patent No.: US 11,916,186 B2
(45) Date of Patent: Feb. 27, 2024

(54) METHOD FOR PREPARING SULFIDE-BASED SOLID ELECTROLYTE, SULFIDE-BASED SOLID ELECTROLYTE PREPARED BY THE METHOD AND ALL-SOLID-STATE LITHIUM SECONDARY BATTERY INCLUDING THE SULFIDE-BASED SOLID ELECTROLYTE

(71) Applicant: SOLIVIS INC., Seoul (KR)

(72) Inventors: Dong Wook Shin, Seongnam-si (KR); Min Yong Eom, Seoul (KR); Seung Hyun Oh, Hanam-si (KR); Chan Hwi Park, Seoul (KR); Sun Ho Choi, Incheon (KR)

(73) Assignee: SOLIVIS INC., Seoul (KR)

( * ) Notice: Subject to any disclaimer, the term of this patent is extended or adjusted under 35 U.S.C. 154(b) by 1168 days.

(21) Appl. No.: 16/077,928

(22) PCT Filed: Feb. 15, 2017

(86) PCT No.: PCT/KR2017/001624
§ 371 (c)(1),
(2) Date: Aug. 14, 2018

(87) PCT Pub. No.: WO2017/142295
PCT Pub. Date: Aug. 24, 2017

(65) Prior Publication Data
US 2021/0194044 A1    Jun. 24, 2021

(30) Foreign Application Priority Data
Feb. 15, 2016   (KR) .................. 10-2016-0017049

(51) Int. Cl.
*H01M 10/00* (2006.01)
*H01M 10/0525* (2010.01)
*H01M 10/0562* (2010.01)

(52) U.S. Cl.
CPC ... *H01M 10/0562* (2013.01); *H01M 10/0525* (2013.01); *H01M 2300/0068* (2013.01)

(58) Field of Classification Search
CPC ......... H01M 10/0562; H01M 10/0525; H01M 2300/0068; H01M 10/052; C01P 2004/04;
(Continued)

(56) References Cited

U.S. PATENT DOCUMENTS 8,591,603 B2    11/2013  Hama et al.
9,595,735 B2    3/2017   Sugiura et al.
(Continued)

FOREIGN PATENT DOCUMENTS

JP    5278437 B2       9/2013
JP    2014-093260 A    5/2014
(Continued)

OTHER PUBLICATIONS

Um, Min Yong et al., "Synthesis of Li2S-P2S5 Glass-ceramics Electrolyte via Solution Based Technique", The Korean Electrochemical Society, 2015 Fall Meeting, 4 pages.
(Continued)

*Primary Examiner* — Nicholas P D'Aniello
(74) *Attorney, Agent, or Firm* — Sughrue Mion, PLLC

(57) ABSTRACT

The present invention relates to a method for preparing a sulfide-based solid electrolyte, a sulfide-based solid electrolyte prepared by the method, and an all-solid-state lithium secondary battery including the sulfide-based solid electrolyte. The method of the present invention includes a) mixing $Li_2S$ with $P_2S_5$ to prepare a mixed powder, b) placing the mixed powder, an ether, and stirring balls in a container, sealing the container, followed by stirring to prepare a suspension, and c) stirring the suspension under high-temperature and high-pressure conditions to prepare sulfide-based solid particles.

11 Claims, 3 Drawing Sheets

(58) Field of Classification Search
CPC .. C01P 2004/60; C01P 2006/40; C01B 17/22; H01B 1/10; Y02E 60/10
USPC ......................................................... 429/322
See application file for complete search history.

(56) References Cited

U.S. PATENT DOCUMENTS

| | | | |
|---|---|---|---|
| 10,020,535 B2* | 7/2018 | Sato | H01M 10/0562 |
| 2007/0160911 A1* | 7/2007 | Senga | H01B 1/10 |
| | | | 429/322 |
| 2007/0196739 A1* | 8/2007 | Seino | H01M 10/052 |
| | | | 429/322 |
| 2010/0200795 A1* | 8/2010 | Ota | H01M 10/0562 |
| | | | 252/62.2 |
| 2011/0108642 A1* | 5/2011 | Hama | H01M 10/052 |
| | | | 241/27 |
| 2011/0167625 A1 | 7/2011 | Hama et al. | |
| 2012/0301778 A1* | 11/2012 | Trevey | H01M 4/386 |
| | | | 429/231.95 |
| 2014/0141339 A1 | 5/2014 | Sugiura et al. | |
| 2014/0227610 A1* | 8/2014 | Aburatani | C03C 10/00 |
| | | | 429/322 |
| 2014/0315098 A1 | 10/2014 | Inoue | |
| 2015/0093652 A1 | 4/2015 | Aihara et al. | |
| 2016/0190638 A1 | 6/2016 | Sugiura et al. | |

FOREIGN PATENT DOCUMENTS

| | | |
|---|---|---|
| JP | 5842918 B2 | 1/2016 |
| KR | 10-2014-0031969 A | 3/2014 |
| KR | 10-2015-0039573 A | 4/2015 |
| KR | 10-2015-0133831 A | 11/2015 |

OTHER PUBLICATIONS

International Search Report for PCT/KR2017/001624, dated May 22, 2017.

* cited by examiner

[Fig. 1]
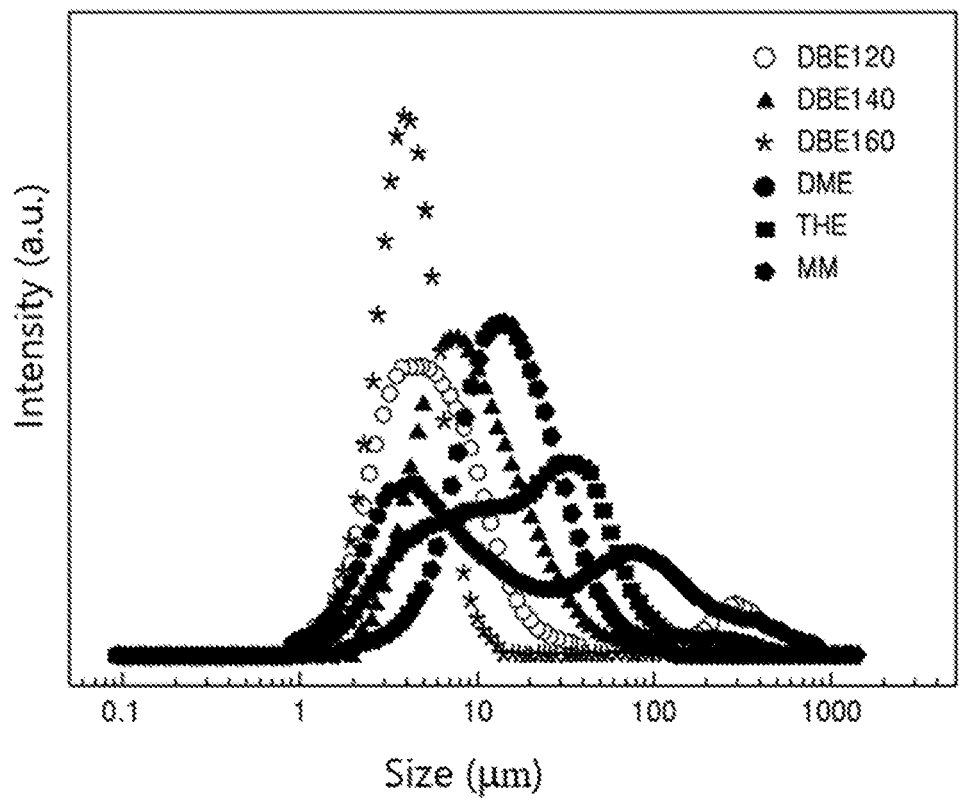
[Fig. 2a]
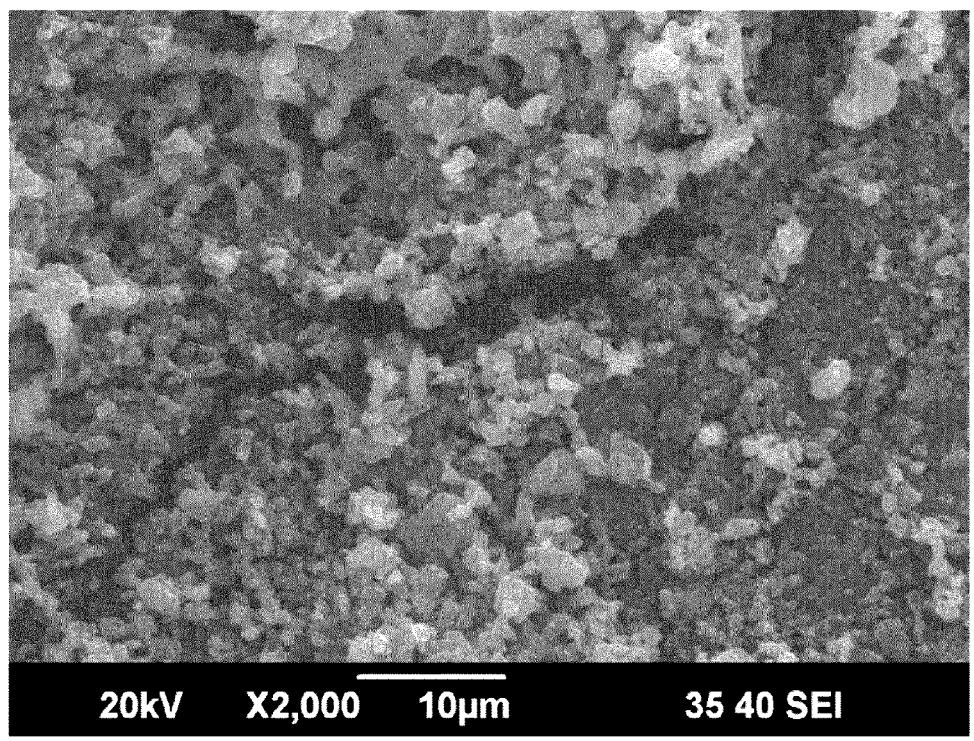

[Fig. 2b]
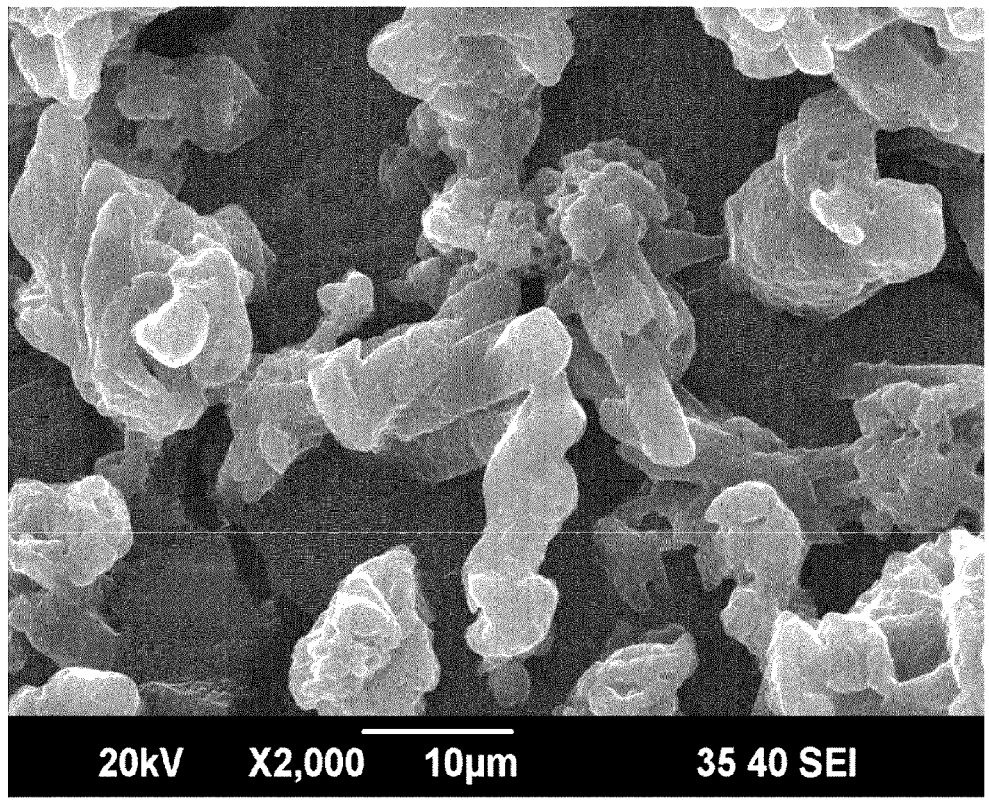
[Fig. 3]
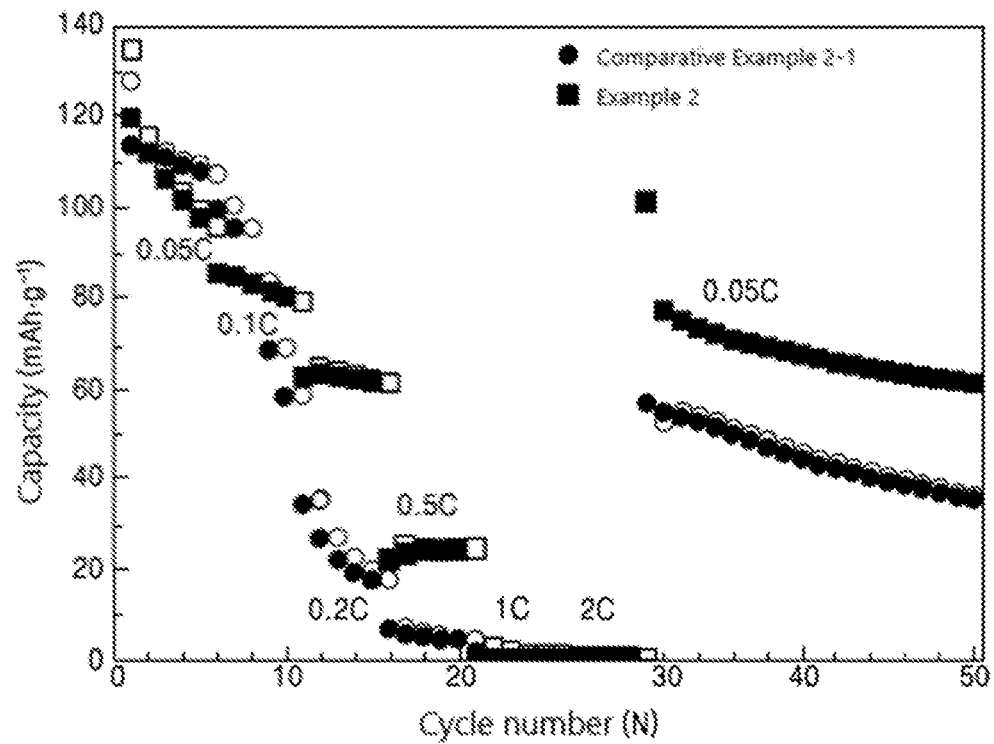

[Fig. 4]
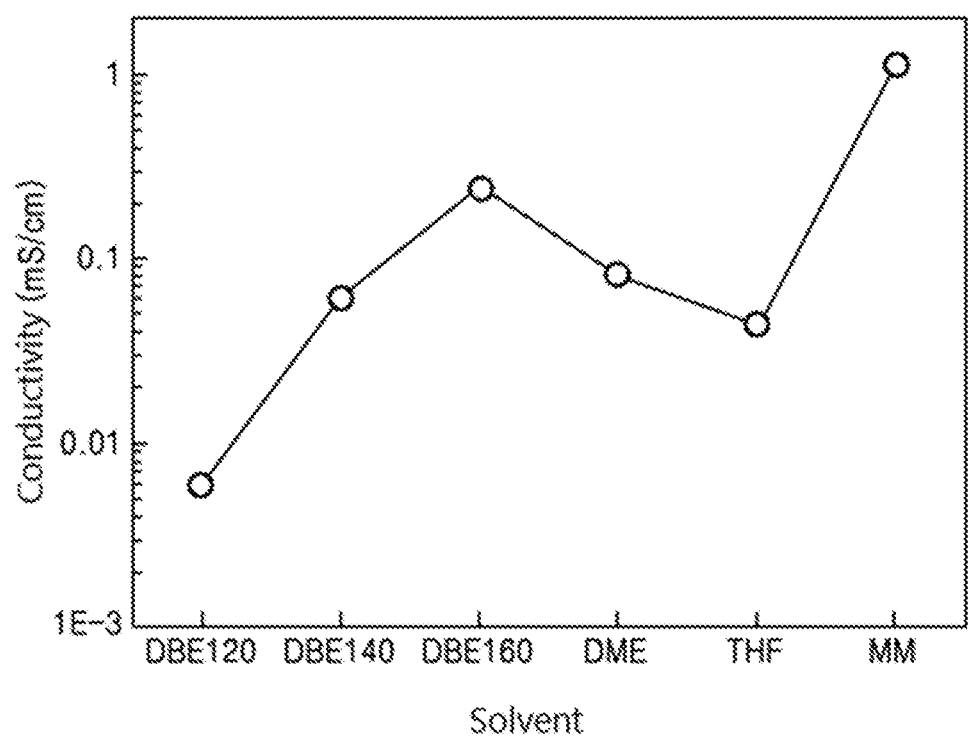

METHOD FOR PREPARING SULFIDE-BASED SOLID ELECTROLYTE, SULFIDE-BASED SOLID ELECTROLYTE PREPARED BY THE METHOD AND ALL-SOLID-STATE LITHIUM SECONDARY BATTERY INCLUDING THE SULFIDE-BASED SOLID ELECTROLYTE

This Application is a National Stage of International Application No. PCT/KR2017/001624 filed Feb. 15, 2017, claiming priority based on Korean Patent Application No. 10-2016-0017049 filed Feb. 15, 2016.

TECHNICAL FIELD

The present invention relates to a method for preparing a sulfide-based solid electrolyte, a sulfide-based solid electrolyte prepared by the method, and an all-solid-state lithium secondary battery including the sulfide-based solid electrolyte.

BACKGROUND ART

In general, secondary batteries refer to batteries capable of repeatedly charging and discharging, unlike primary batteries that cannot be charged. Secondary batteries are widely employed in the field of electronic devices, including mobile phones, PDAs, and notebook computers. Particularly, lithium secondary batteries are currently used as power sources for electronic devices due to their high operating voltage of 3.6 V, which is approximately three times that of nickel-cadmium batteries or nickel-hydride batteries. Another advantage of lithium secondary batteries is high energy density per unit weight. Due to these advantages, the market for lithium secondary batteries is rapidly expanding.

Lithium secondary batteries usually use a lithium-based oxide as a cathode active material, a carbon material as an anode active material, and a liquid electrolyte containing an organic compound. Particularly, lithium secondary batteries are classified into liquid electrolyte batteries and solid electrolyte batteries by the type of electrolyte they employ. Solid electrolyte batteries include gel polymer electrolyte batteries, all-solid-state electrolyte batteries, and inorganic solid electrolyte batteries. In this connection, overcharging or thermal shock of liquid electrolyte batteries and gel polymer electrolyte batteries increases the risk of fire or explosion of organic electrolyte solutions or gel-type polymer electrolytes impregnated with organic electrolyte solutions. Further, these electrolytes are highly reactive and are thus unsuitable for use in next-generation lithium secondary batteries, such as high-capacity lithium secondary batteries and lithium-air batteries.

In an attempt to solve the above-mentioned safety problems, research has been conducted to develop various types of solid electrolytes. Such solid electrolytes are broadly classified into oxide solid electrolytes and sulfide solid electrolytes. Generally, sulfide solid electrolytes have higher ionic conductivity than oxide solid electrolytes because the electrostatic binding energy of sulfur is low. Sulfide solid electrolytes, particularly $Li_2S$—$P_2S_5$-based solid electrolytes, have received much attention because they exhibit ionic conductivity comparable to that of organic liquid electrolytes.

Mechanical milling is the most widely used process for synthesizing $Li_2S$—$P_2S_5$-based solid electrolytes. Solid electrolytes obtained by mechanical milling have a size on the order of several to several tens of micrometers. However, the large size of solid electrolyte particles increases the thickness of electrolyte layers of all-solid-state lithium secondary batteries, which directly leads to a reduction in battery performance, including energy density. Under these circumstances, there is an urgent need to develop methods for preparing solid electrolytes having a particle size of a few micrometers that can be used to reduce the thickness of electrolyte layers. In order to form paths through which electrons and lithium ions flow in an electrode layer, it is necessary to produce a composite electrode in which an electrode active material, a conductive carbonaceous material, and a solid electrolyte are mixed. However, when the particle size of the solid electrolyte is large, an inefficiently large amount of the solid electrolyte is required in the paths for lithium ions within the composite electrode. Moreover, the reduced contact area between the electrode active material and the solid electrolyte is disadvantageous for fast charge/discharge and the volume variation induced by charge/discharge reactions causes loss of ion-exchange paths, deteriorating the long-term cycle life characteristics of the battery.

In this connection, Korean Patent Publication No. 10-2015-0039573 (Patent Document 1) discloses a sulfide solid electrolyte containing a sulfide precipitate obtained by mixing at least $Li_2S$ and $P_2S_5$ in an organic solvent containing tetrahydrofuran, a tetrahydrofuran-based compound substituted with a $C_1$-$C_6$ hydrocarbon group optionally including an ether group or a $C_2$-$C_7$ ether compound. Further, Japanese Patent No. 5278437 (Patent Document 2) discloses a method for fabricating an all-solid-state lithium battery, including: mixing $Li_2S$, $P_2S_5$, and $P_2O_5$ in a molar ratio such that the raw materials satisfy the relationship $(Li_2S)/(P_2S_5+P_2O_5)<3$, to prepare a composition; and synthesizing a sulfide solid electrolyte from the composition by vitrification means. Korean Patent Publication No. 10-2014-0031969 (Patent Document 3) discloses a method for producing a sulfide solid electrolyte material, including: adding an ether compound to a coarse-grained material of a sulfide solid electrolyte material; and microparticulating the coarse-grained material by a pulverization treatment.

However, the prior art sulfide solid electrolytes have non-uniform particle sizes that are difficult to control. Further, the solid electrolyte produced by mechanical milling has a large size on the order of several to several tens of micrometers. The use of the large-sized solid electrolyte increases the thickness of the electrolyte layer and causes poor battery performance.

DETAILED DESCRIPTION OF THE INVENTION

Problems to be Solved by the Invention

The present invention has been made in an effort to solve the problems of the prior art, and it is an object of the present invention to provide a method for preparing a sulfide-based solid electrolyte that has a small particle size on the order of a few hundreds of nanometers, has a very uniform particle distribution, and ensures very high energy density and good long-term cycle life characteristics when applied to a lithium secondary battery, a sulfide-based solid electrolyte prepared by the method, and an all-solid-state lithium secondary battery including the sulfide-based solid electrolyte.

Means for Solving the Problems

A first aspect of the present invention provides a method for preparing a sulfide-based solid electrolyte, including a)

mixing $Li_2S$ with $P_2S_5$ to prepare a mixed powder, b) placing the mixed powder, an ether, and stirring balls in a container, sealing the container, followed by stirring to prepare a suspension, and c) stirring the suspension under high-temperature and high-pressure conditions to prepare sulfide-based solid particles.

According to one embodiment of the present invention, the $Li_2S$ and the $P_2S_5$ may be mixed in a molar ratio of 65:35 to 85:15.

According to a further embodiment of the present invention, the ether may be dibutyl ether, dipropyl ether or a mixture thereof.

According to another embodiment of the present invention, the ether may be used in admixture with a non-polar organic solvent.

According to another embodiment of the present invention, the non-polar organic solvent may be heptane, toluene or a mixture thereof.

According to another embodiment of the present invention, the ether may be used in an amount of 1 ml to 50 ml per gram of the mixed powder.

According to another embodiment of the present invention, the stirring balls may be zirconia balls having a diameter of 1 mm to 12 mm.

According to another embodiment of the present invention, in step b), the stirring may be performed at a rate of 50 rpm to 150 rpm for 10 hours to 30 hours.

According to another embodiment of the present invention, step c) may be carried out at a temperature of 150° C. to 200° C. and a vapor pressure of 1 bar to 5 bars for 20 hours to 30 hours.

According to another embodiment of the present invention, the method may further include separating the sulfide-based solid particles from the suspension and drying the sulfide-based solid particles at 130° C. to 170° C. for 1 hour to 5 hours, after step c).

According to another embodiment of the present invention, one or more sulfides selected from the group consisting of $SiS_2$, $GeS_2$, $B_2S_3$, $Al_2S_3$, and $TiS_2$ may be used instead of the $P_2S_5$ or may be used in combination with the $P_2S_5$.

A second aspect of the present invention provides a sulfide-based solid electrolyte prepared by the method.

According to one embodiment of the present invention, the sulfide-based solid electrolyte may have an average particle size of 100 nm to 10 μm.

A final aspect of the present invention provides an all-solid-state lithium secondary battery including the sulfide-based solid electrolyte.

Effects of the Invention

The sulfide-based solid electrolyte of the present invention has a small particle size on the order of a few hundreds of nanometers and has a very uniform particle distribution. Due to these advantages, the sulfide-based solid electrolyte of the present invention ensures very high energy density and good long-term cycle life characteristics when applied to a lithium secondary battery. Therefore, the sulfide-based solid electrolyte of the present invention can provide a solution to the problems of low energy density and poor high-rate characteristics, which are the greatest obstacles to the commercialization of all-solid-state lithium secondary batteries, and can be thus advantageously employed in a variety of applications, including power sources for next-generation electric vehicles.

BRIEF DESCRIPTION OF THE DRAWINGS

FIG. 1 shows the particle size distributions of sulfide-based solid electrolyte particles prepared in Example 1 and Comparative Examples 1-1 to 1-5.

FIGS. 2a and 2b are electron microscopy images of solid electrolyte particles prepared in Example 1 and Comparative Example 1, respectively.

FIG. 3 compares the charge/discharge characteristics of all-solid-state lithium secondary batteries fabricated in Example 2 and Comparative Example 2-1.

FIG. 4 compares the electrical conductivities of all-solid-state lithium secondary batteries fabricated in Example 2 and Comparative Examples 2-1 to 2-5.

BEST MODE FOR CARRYING OUT THE INVENTION

The present invention will now be described in more detail.

The size and distribution of electrolyte particles have a direct influence on the energy density of an all-solid-state lithium secondary battery using the electrolyte particles. The use of a solid electrolyte having a small particle size and a uniform particle distribution increases the number of contact interfaces between an electrode active material and the solid electrolyte and the number of channels of paths for lithium ion exchange, which are very advantageous for fast charge/discharge of a battery using the solid electrolyte while maintaining the life of the battery. Thus, the present invention intends to provide a sulfide-based solid electrolyte that has a much smaller particle size and a more uniform particle distribution than conventional sulfide-based solid electrolytes having a size on the order of several to several tens of micrometers.

The present invention provides a method for preparing a sulfide-based solid electrolyte, including a) mixing $Li_2S$ with $P_2S_5$ to prepare a mixed powder, b) placing the mixed powder, an ether, and stirring balls in a container, sealing the container, followed by stirring to prepare a suspension, and c) stirring the suspension under high-temperature and high-pressure conditions to prepare sulfide-based solid particles.

The mixing ratio of the $Li_2S$ to the $P_2S_5$ in step a) affects the lithium ion conductivity of the final solid electrolyte. Considering this, it is preferable to mix the $Li_2S$ with the $P_2S_5$ in a molar ratio of 65:35 to 85:15.

For the purpose of overcoming the limitations of conventional methods based on mechanical milling, the method of the present invention is based on a solution process using an ether compound as a solvent. Good dispersion performance the ether compound is advantageous in the synthesis of the sulfide-based solid electrolyte based on a solution process. Examples of ether compounds suitable for use in the method of the present invention include dibutyl ether and dipropyl ether. These ether compounds may be used alone or as a mixture thereof. Particularly, the use of dibutyl ether as the solvent can achieve a much smaller particle size and a more uniform particle distribution of the sulfide-based solid electrolyte than the use of other organic solvents, as described in Examples section that follows.

In step b), the ether may be used in admixture with a non-polar organic solvent. Examples of such non-polar organic solvents include, but are not limited to, heptane and toluene. These non-polar organic solvents may be used alone or as a mixture thereof.

The ether may be used in an amount of 1 ml to 50 ml per gram of the mixed powder. A volume of the ether less than 1 ml is insufficient to disperse the mixed powder because the amount of the solvent is small compared to that of the powder. Meanwhile, a volume of the ether exceeding 50 ml required in step c) is unnecessary.

The stirring balls used in step b) may be zirconia balls having a diameter of 1 mm to 12 mm. If the diameter of the zirconia balls is less than 1 mm, the initial powder is not finely divided. Meanwhile, if the diameter of the zirconia balls exceeds 12 mm, the stirring time is increased.

In step b), the stirring may be performed at a rate of 50 rpm to 150 rpm for 20 hours to 30 hours. If the stirring rate is less than 50 rpm or the stirring time is less than 20 hours, the particles are not uniformly distributed in the suspension. Meanwhile, if the stirring rate exceeds 150 rpm or the stirring time exceeds 30 hours, excessive energy is applied to the powder, causing side reactions.

The sulfide-based solid electrolyte is synthesized under high-temperature and high-pressure conditions. The synthesis reaction temperature in step c) greatly affects the size and distribution of the particles, as can be seen from the following Examples section. Step c) may be carried out at a temperature of 150° C. to 200° C. and a vapor pressure of 1 bar to 5 bars for 20 hours to 30 hours. Particularly, if the synthesis temperature is less than 150° C. and the synthesis pressure is less than 1 bar, energy is too low to synthesize the solid electrolyte. Meanwhile, if the synthesis temperature exceeds 200° C. and the synthesis pressure exceeds 5 bars, the internal pressure of the container increases excessively, causing problems in terms of safety and processing efficiency.

The method of the present invention may further include separating the sulfide-based solid particles from the suspension and drying the sulfide-based solid particles at 130° C. to 170° C. for 1 hour to 5 hours, after step c).

The $P_2S_5$ is exemplified as a sulfide-based precursor and may be replaced by or used in combination with one or more sulfides selected from the group consisting of $SiS_2$, $GeS_2$, $B_2S_3$, $Al_2S_3$, and $TiS_2$.

The present invention also provides a sulfide-based solid electrolyte prepared by the method. The sulfide-based solid electrolyte of the present invention has a very small average particle size of 100 nm to 10 μm and a very narrow particle size distribution compared to conventional sulfide-based solid electrolytes. The present invention also provides an all-solid-state lithium secondary battery using the sulfide-based solid electrolyte. The all-solid-state lithium secondary battery of the present invention possesses very high energy density and excellent long-term cycle life characteristics.

MODE FOR CARRYING OUT THE INVENTION

The present invention will be explained in more detail with reference to the following examples. However, these examples are provided to assist in understanding the invention and are not intended to limit the scope of the present invention.

Example 1: Preparation of Sulfide-Based Solid Electrolyte $Li_2S$ (Alfa Aesar) and $P_2S_5$ (Sigma Aldrich) were mixed in a molar ratio of 75:25. 2 g of the mixed powder, 10 ml of dibutyl ether (Sigma Aldrich), and 10 g of 3-mm-diameter zirconia balls were placed in a 20 ml glass bottle. After the glass bottle was sealed, the mixed powder and the solvent were sufficiently mixed at a rate of 120 rpm for 24 h to prepare a suspension. The suspension was transferred to a Teflon container, introduced into an autoclave, and stirred continuously at 160° C. for 24 h. Thereafter, the resulting powder was separated from the dibutyl ether. The powder was dried at 150° C. for 2 h for complete removal of the solvent to prepare a sulfide-based solid electrolyte.

Comparative Example 1-1: Preparation of Sulfide-Based Solid Electrolyte Based on Mechanical Milling $Li_2S$ (Alfa Aesar) and $P_2S_5$ (Sigma Aldrich) were mixed in a molar ratio of 75:25. 1.5 g of the mixed powder and twelve 10-mm-diameter zirconia balls were placed in a 100 ml zirconia pot. The zirconia pot was loaded into a planetary ball mill. The mixed powder was sufficiently milled with stirring at a rate of 520 rpm for 25 h to synthesize a sulfide-based solid electrolyte. The solid electrolyte was annealed at a temperature of 220° C. for 3 h.

Comparative Example 1-2: Preparation of Sulfide-Based Solid Electrolyte Based on Low-Temperature Processing A sulfide-based solid electrolyte was prepared in the same manner as in Example 1, except that the suspension was introduced into an autoclave set at a temperature of 120° C.

Comparative Example 1-3: Preparation of Sulfide-Based Solid Electrolyte Based on Low-Temperature Processing A sulfide-based solid electrolyte was prepared in the same manner as in Example 1, except that the suspension was introduced into an autoclave set at a temperature of 140° C.

Comparative Example 1-4: Preparation of Sulfide-Based Solid Electrolyte Using Dimethoxyethane A sulfide-based solid electrolyte was prepared in the same manner as in Example 1, except that dimethoxyethane (Sigma Aldrich) was used instead of dibutyl ether and the suspension was introduced into an autoclave set at a temperature of 100° C.

Comparative Example 1-5: Preparation of Sulfide-Based Solid Electrolyte Using Tetrahydrofuran A sulfide-based solid electrolyte was prepared in the same manner as in Example 1, except that tetrahydrofuran (Sigma Aldrich) was used instead of dibutyl ether and the suspension was introduced into an autoclave set at a temperature of 85° C.

Evaluation Example 1: Comparison of Physical Properties of the Solid Electrolytes The sulfide-based solid electrolytes prepared in Example 1 and Comparative Examples 1-1 to 1-5 were named "DBE160", "MM", "DBE120", "DBE140", "DME", and "THF", respectively, and their particle size distributions were measured. The particle sizes of the sulfide-based solid electrolytes were measured using a laser scattering particle size analyzer (S3500, Microtrac). First, 0.1 g of each of the solid electrolyte powders was mixed with 10 ml anhydrous toluene (Sigma Aldrich). Then, the mixture was introduced into the analyzer and dispersed using an ultrasonic homogenizer mounted in the analyzer. The particle size of the solid electrolyte was measured by laser scattering.

Table 1 shows D10, D50, and D90 values for the samples. In Table 1, D10 means the average diameter of particles corresponding to a fraction of 10%, as calculated from the smallest particle, D50 means the average diameter of particles corresponding to a fraction of 50%, as calculated from the smallest particle, and D90 means the average diameter of particles corresponding to a fraction of 10%, as calculated from the largest particle.

TABLE 1

| Sulfide-based solid electrolyte | D10 (μm) | D50 (μm) | D90 (μm) |
|---|---|---|---|
| DBE120 | 2.33 | 5.32 | 21.24 |
| DBE140 | 4.01 | 8.60 | 26.95 |
| DBE160 | 1.24 | 2.19 | 3.80 |
| DME | 2.46 | 11.09 | 157.60 |
| THF | 3.50 | 16.62 | 59.08 |
| MM | 6.40 | 14.12 | 33.35 |

As can be seen from the results in Table 1, the sulfide-based solid electrolyte particles of Example 1 (DBE160) had much lower D10, D50, and D90 values than the particles of Comparative Examples 1-5. In addition, the difference between the D10 and D90 values of DBE160 was on the order of 2 μm, indicating high uniformity of the particles. Particularly, the nanometer-sized particles of DBE160 were impossible to measure due to the limited resolution of the analyzer.

In contrast, there were large differences between the D10 and D90 values of THF and DME, indicating bimodal particle size distributions of the electrolytes. The D50 of MM (14.12) indicates that MM had a much larger size than the particles prepared by wet processing using dibutyl ether.

FIG. 1 shows the particle size distributions of the samples, which were measured using S3500 (Microtrac). Referring to FIG. 1, DBE160 had a very narrow particle size distribution and a very small particle size.

Furthermore, the solid electrolyte particles of Example 1 and Comparative Example 1-1 were observed using a scanning electron microscope (JCM5700, JEOL) and are shown in FIGS. 2a and 2b, respectively. Referring to FIGS. 2a and 2b, the solid electrolyte particles of Example 1 had a small particle size on the order of hundreds of nm to tens of μm (FIG. 2a) whereas the solid electrolyte particles of Comparative Example 1-1 had a size of several to tens of μm.

Example 2: Fabrication of all-Solid-State Lithium Secondary Battery

A lithium cobalt oxide ($LiCoO_2$) and a conductive carbon material (Super-P carbon) were dry-mixed in a ratio of 78.4:19.6:2 to produce a composite electrode. Alternatively, a composite electrode in the form of a sheet was produced by casting. In this case, a binder was further added. The composite electrode was applied onto a metal or carbon fiber sheet as a current collector. Alternatively, the composite electrode was applied to the surface of an electrolyte, followed by drying at 100-200° C. to fabricate a battery cell.

The sulfide-based solid electrolyte prepared in Example 1 and the composite electrode were used to fabricate an all-solid-state lithium secondary battery. Specifically, a pressure of 1 ton was applied to a 16-mm-diameter mold to form an intermediate electrolyte layer. The composite electrode was attached to one side of the intermediate electrolyte layer and a pressure of 4 tons were applied thereto. A lithium-indium foil and a copper foil were sequentially attached to the other side of the intermediate electrolyte layer to form a counter electrode and a pressure of 3 tons was applied thereto. The resulting three-layer pellet was assembled into a 2032-type coin cell.

Comparative Examples 2-1 to 2-5: Fabrication of All-Solid-State Lithium Secondary Batteries All-solid-state lithium secondary batteries were fabricated in the same manner as in Example 2, except that the solid electrolytes of Comparative Examples 1-1 to 1-5 were used instead of the solid electrolyte of Example 1.

Evaluation Example 2: Comparison of Electrochemical Properties of the All-Solid-State Lithium Secondary Batteries The electrochemical properties of the all-solid-state lithium secondary batteries of Example 2 and Comparative Examples 2-1 to 2-5 were analyzed.

First, the charge/discharge characteristics of the all-solid-state lithium secondary batteries of Example 2 and Comparative Example 2-1 were compared. The results are shown in FIG. 3. Referring to FIG. 3, the initial capacity of the all-solid-state lithium secondary battery of Example 2 decreased markedly but the high-rate and cycle life characteristics of the all-solid-state lithium secondary battery of Example 2 were maintained for a longer time than those of the all-solid-state lithium secondary battery of Comparative Example 2-1.

The data were quantified and are shown in Table 2. Referring to Table 2, the all-solid-state lithium secondary battery of Example 2 had a lower lithium ion conductivity but maintained their high-rate and cycle life characteristics for a longer time than the all-solid-state lithium secondary battery of Comparative Example 2-1. These results reveal that the small particle size of the sulfide-based solid electrolyte prepared in Example 1 is sufficiently effective in improving the electrochemical properties of the all-solid-state lithium secondary battery.

TABLE 2

| | Electrochemical properties | | |
|---|---|---|---|
| | Lithium ion conductivity (mS/cm) | Discharge capacity after 1 cycle (mAh/g) | Discharge capacity after 50 cycles (mAh/g) |
| Example 2 | 0.24 | 119 | 61 |
| Comparative Example 2-1 | 1.12 | 114 | 35 |

Furthermore, the electrical conductivities of the all-solid-state lithium secondary batteries fabricated in Example 2 and Comparative Examples 2-1 to 2-5 were analyzed and compared. The results are shown in FIG. 4. Specifically, a pressure of 4 tons was applied to a 16-mm-diameter mold to form an electrolyte layer. An indium foil and an aluminum foil were sequentially attached to both sides of the electrolyte layer and a pressure of 3 tons was applied thereto to produce a three-layer pellet. The pellet was transferred to a jig and its lithium ion conductivity was measured by impedance spectroscopy using an impedance analyzer (1260, Solartron).

The data in FIG. 4 were quantified and the results are shown in Table 3.

TABLE 3

| Sample | Lithium ion conductivity (mS/cm) |
|---|---|
| DBE120 | 0.0062 |
| DBE140 | 0.061 |
| DBE160 | 0.24 |
| DME | 0.082 |
| THF | 0.044 |
| MM | 1.12 |

Referring to FIG. 4 and Table 3, when dibutyl ether was used, the synthesis temperature increased, resulting in an increase in electrical conductivity. This is believed to be because the increased synthesis temperature led to an increase in reaction rate.

It was also demonstrated that higher electrical conductivities were achieved when dibutyl ether was used than when dimethoxyethane or tetrahydrofuran was used under the same conditions. The higher conductivities are believed to be because dibutyl ether allows the synthesis reaction to proceed further under the same pressure conditions due to its good dispersion performance and high boiling point.

Despite the fact that the sample (MM) prepared based on mechanical milling has a higher electrical conductivity than the electrolyte of Example 1, the battery using MM failed to maintain their high-rate and cycle life characteristics because of the large particle size of MM on the order of tens of μm.

INDUSTRIAL APPLICABILITY

The solid electrolyte of the present invention has a small particle size on the order of a few hundreds of nanometers and has high uniformity. Due to these advantages, solid electrolyte of the present invention ensures very high energy density and good long-term cycle life characteristics when applied to a lithium secondary battery. Therefore, the solid electrolyte of the present invention can provide a solution to the problems of low energy density and poor high-rate characteristics, which are the greatest obstacles to the commercialization of all-solid-state lithium secondary batteries. In addition, the solid electrolyte of the present invention can be expected to find applications, including power sources for next-generation electric vehicles.

The invention claimed is:

1. A method for preparing a sulfide-based solid electrolyte, comprising
   a) mixing at least one of $SiS_2$, $GeS_2$, $B_2S_3$, $Al_2S_3$, $TiS_2$ and $P_2S_5$ with $Li_2S$ to prepare a mixed powder,
   b) placing the mixed powder, an ether, and stirring balls in a first container, sealing the container, followed by stirring to prepare a suspension, wherein the at least one of $SiS_2$, $GeS_2$, $B_2S_3$, $Al_2S_3$, $TiS_2$ and $P_2S_5$ with $Li_2S$ particles of the mixed powder are uniformly distributed in the suspension,
   c) placing the suspension in a second container and stirring the suspension under synthesis temperature and synthesis pressure conditions to synthesize sulfide-based solid particles, and
   d) separating the sulfide-based solid particles from the suspension and drying the sulfide-based solid particles at 130° C. to 170° C. for 1 hour to 5 hours,
   wherein step c) is carried out at a temperature of 150° C. to 200° C. and a vapor pressure of 1 bar to 5 bars for 20 hours to 30 hours.

2. The method according to claim 1, wherein the $Li_2S$ and the at least one of $SiS_2$, $GeS_2$, $B_2S_3$, $Al_2S_3$, $Ti\ S_2$ and $P_2S_5$ are mixed in a molar ratio of 65:35 to 85:15.

3. The method according to claim 1, wherein the ether is dibutyl ether, dipropyl ether or a mixture thereof.

4. The method according to claim 1, wherein the ether is used in admixture with a non-polar organic solvent.

5. The method according to claim 4, wherein the non-polar organic solvent is heptane, toluene or a mixture thereof.

6. The method according to claim 1, wherein the ether is used in an amount of 1 ml to 50 ml per gram of the mixed powder.

7. The method according to claim 1, wherein the stirring balls are zirconia balls having a diameter of 1 mm to 12 mm.

8. The method according to claim 1, wherein, in step b), the stirring is performed at a rate of 50 rpm to 150 rpm for 20 hours to 30 hours.

9. A sulfide-based solid electrolyte prepared by the method according to claim 1.

10. The sulfide-based solid electrolyte according to claim 9, wherein the sulfide-based solid electrolyte has an average particle size of 100 nm to 10 μm.

11. An all-solid-state lithium secondary battery comprising the sulfide-based solid electrolyte according to claim 9.

* * * * *